(12) United States Patent
Benes (10) Patent No.: US 8,787,047 B2
(45) Date of Patent: Jul. 22, 2014

(54) SYSTEM AND METHOD FOR DISSIPATING ENERGY ON THE PRIMARY SIDE OF A BI-DIRECTIONAL SWITCHING POWER SUPPLY

(75) Inventor: Michael J. Benes, Irvington, NJ (US)

(73) Assignee: Agilent Technologies, Inc., Santa Clara, CA (US)

( * ) Notice: Subject to any disclaimer, the term of this patent is extended or adjusted under 35 U.S.C. 154(b) by 1755 days.

(21) Appl. No.: 11/952,276

(22) Filed: Dec. 7, 2007

(65) Prior Publication Data

US 2009/0146626 A1    Jun. 11, 2009

(51) Int. Cl.
*H02M 7/79* (2006.01)

(52) U.S. Cl.
USPC .......................... 363/56.12; 363/15

(58) Field of Classification Search
CPC ........... H02M 7/66; H02M 7/68; H02M 7/79; H02M 7/797

USPC ........... 363/15, 131, 56.12; 307/100; 323/908
See application file for complete search history.

(56) References Cited

U.S. PATENT DOCUMENTS

| 6,496,345 B1 * | 12/2002 | Smith ........................... 361/93.9 |
| 2003/0002304 A1 * | 1/2003 | Zhu et al. ..................... 363/56.02 |
| 2007/0262920 A1 * | 11/2007 | Werner et al. ................... 345/46 |

* cited by examiner

*Primary Examiner* — Timothy J Dole
*Assistant Examiner* — Matthew Grubb (57) ABSTRACT

A system for dissipating energy in a power supply includes a bidirectional switching power output stage coupled to a primary power supply side and a secondary power supply side, the bi-directional switching power output stage configured to provide a positive voltage and a positive current, the bi-directional switching power output stage also configured to provide a positive voltage and to receive a current. The system for dissipating energy in a power supply also includes a current sinking circuit coupled to the primary power supply side, the current sinking circuit configured to dissipate energy when the secondary power supply side of the switching power supply is receiving current.

19 Claims, 7 Drawing Sheets

SYSTEM AND METHOD FOR DISSIPATING ENERGY ON THE PRIMARY SIDE OF A BI-DIRECTIONAL SWITCHING POWER SUPPLY

BACKGROUND

Figure 1A:
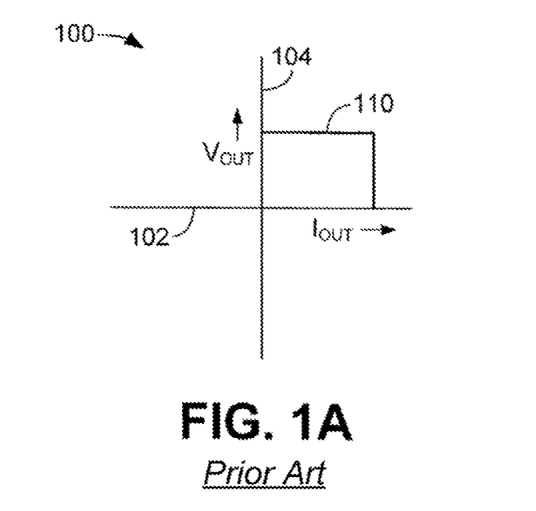
FIG. 1A is a graphical view illustrating the operation of a switching power supply in quadrant one.

Many power supplies are designed to provide both a positive and negative output polarity of output current and a unipolar output voltage. An example of such a power supply could be a switching power supply employing synchronous rectifiers. When the output voltage and the output current are both positive, the power supply is said to be operating in "quadrant one." Quadrant one operation is shown in FIG. 1A. FIG. 1A shows a graphical illustration 100 in which the horizontal axis 102 represents output current and the vertical axis 104 represents output voltage. The trace 110 illustrates a positive output voltage and a positive output current. If the net energy flow is from the primary (input) side of the power supply to the secondary (output) side of the power supply, the power supply is said to be "sourcing" power.

It is also desirable to have the ability to reduce the output voltage when a lower voltage output is desired. In order to rapidly reduce the output voltage of the power supply, typically a circuit is coupled to the secondary side of the power supply and is employed to allow energy to dissipate from the capacitances, or possibly a battery or other energy source coupled to the secondary side of the power supply. The circuit is frequently implemented as a transistor and related circuitry connected across the output side of the power supply. When a reduction in output voltage is desired, the circuit provides a path through which to discharge the secondary side output capacitors or battery until the desired voltage level is reached. This is a state of operation in which the voltage is positive, but the output current is negative. When a power supply is operating in such a condition, it is said to be operating in "quadrant two." In a bidirectional switching power supply, if the net energy flow is from the secondary (output) side of the power supply to the primary (input) side of the power supply, the power supply is said to be "sinking" power and the circuit is referred to as a "current sinking" circuit." Such is the case, for example, when either the output capacitors or a battery coupled to the secondary side of the power supply are discharged.

Operation in quadrant two may be momentary, such as when discharging an output capacitor, or continuous, such as when discharging a battery.

Figure 1B:
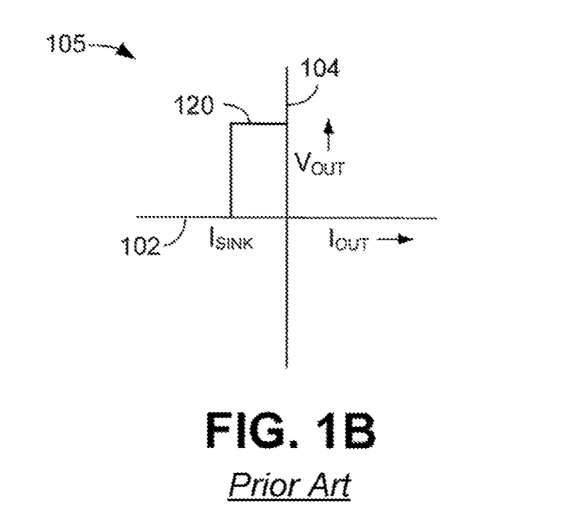
FIG. 1B is a graphical view illustrating the operation of a switching power supply in quadrant two.

Quadrant two operation is shown in FIG. 1B. FIG. 1B shows a graphical illustration 105 in which the horizontal axis 102 represents output current and the vertical axis 104 represents output voltage. The trace 120 illustrates a positive output voltage and a negative output current. When operating in quadrant two, a power supply is said to be "sinking" current from the secondary side of the power supply.

In the past, a current sinking circuit has been added to the secondary side of a power supply that typically operates only in quadrant one to allow for rapid discharge of the output and load capacitances associated with the output circuitry. Further, in some applications, the current sinking circuit acts as a steady state "load" to sink current. This provides at least some degree of quadrant two operation for a power supply designed to operate in quadrant one.

Prior art solutions that achieve quadrant two operation by the addition of a current sinking circuit on the secondary side of the power supply may have difficulty achieving a smooth transition from sourcing to sinking current. In quadrant one operation, a voltage control loop associated with the power supply operates through a switching supply pulse width modulator to produce positive output current. In quadrant two operation, the same voltage control loop must operate the current sinking circuit while the pulse width modulator is off. As a result, a smooth transition from sourcing current to sinking current can be very difficult to achieve because of the very different loop dynamics involved.

In addition, other difficulties can be encountered when controlling a current sinking circuit located on the secondary side of a power supply when the output voltage is low. This causes any transistors associated with the current sinking circuit to operate near saturation. When the transistors in the current sinking circuit saturate, non-linear control loop behavior can cause anomalies, glitches or oscillation on the power supply output. The design of a control loop to overcome these problems can be very difficult to achieve and can be very complex.

Further, when placing current sinking circuitry across the secondary side of the power supply, the voltage applied to the current sinking circuit is not constant, requiring the use of transistors, which must withstand both high current and high voltage. This increases the cost of the current sinking circuit and makes a non-optimal design.

Therefore, it would be desirable to have a way to transfer energy from the output side of a power supply at any output voltage, while maintaining a steady voltage across the current sinking circuitry.

SUMMARY

In accordance with an embodiment, a system for dissipating energy in a power supply, comprises a bidirectional switching power output stage coupled to a primary power supply side and a secondary power supply side, the bi-directional switching power output stage configured to provide a positive voltage and a positive current, the bi-directional switching power output stage also configured to provide a positive voltage and to receive a current. The system for dissipating energy in a power supply also comprises a current sinking circuit coupled to the primary power supply side, the current sinking circuit configured to dissipate energy when the secondary power supply side of the switching power supply is receiving current.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

The system and method for dissipating energy on the primary side of a bi-directional switching power supply described below can be used in any synchronous rectifier or bidirectional DC to DC converter. The system and method for dissipating energy on the primary side of a bi-directional switching power supply includes a current sinking circuit that is located on the input, or primary, side of a bidirectional switching power supply.

Figure 2A:
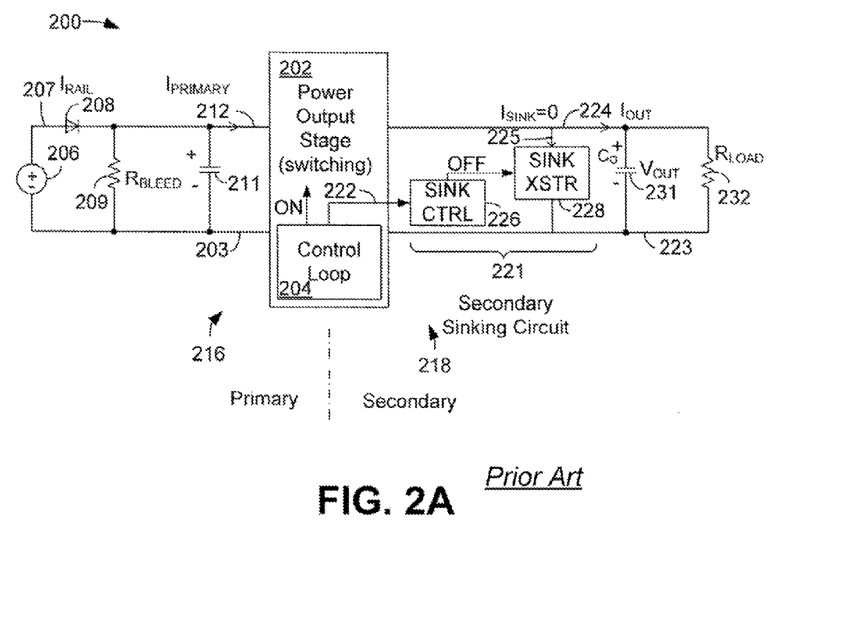
FIG. 2A is a schematic diagram illustrating a simplified power supply module including a prior art current sinking circuit operating in quadrant one.

FIG. 2A is a schematic diagram illustrating a simplified power supply module 200 including a prior art current sinking circuit, located on the secondary side of a power supply. The power supply module 200 includes a primary rail supply 206 coupled to a diode 208. A resistor 209 is coupled between the connections 212 and 203. The connection 212 carries the primary current, $I_{PRIMARY}$. The resistor 209 can be referred to as a "bleed" resistor. A capacitance 211 is located across the connections 212 and 203. A power output stage 202 receives the primary current on connection 212. The output of the power output stage 202 is provided over connection 224. The output current, $I_{OUT}$, is supplied through a load resistance 232 across the connections 224 and 223. The output voltage, $V_{OUT}$, appears across the capacitance 231. The power supply module 200 includes a primary, or input, side 216 and a secondary, or output, side 218. The power output stage 202 may optionally include an isolation transformer to electrically isolate the primary side 216 from the secondary side 218.

A current sinking transistor 228 is located across the connections 224 and 223. A current sinking control circuit, 226 provides the control to the transistor 228. A control loop 204 within the power output stage 202 provides the control for the power output stage 202 and also provides a control signal over connection 222 to the current sinking control circuit 226. The current sinking control circuit 226 and the transistor 228 form what is referred to as a secondary sinking circuit 221.

Figure 2B:
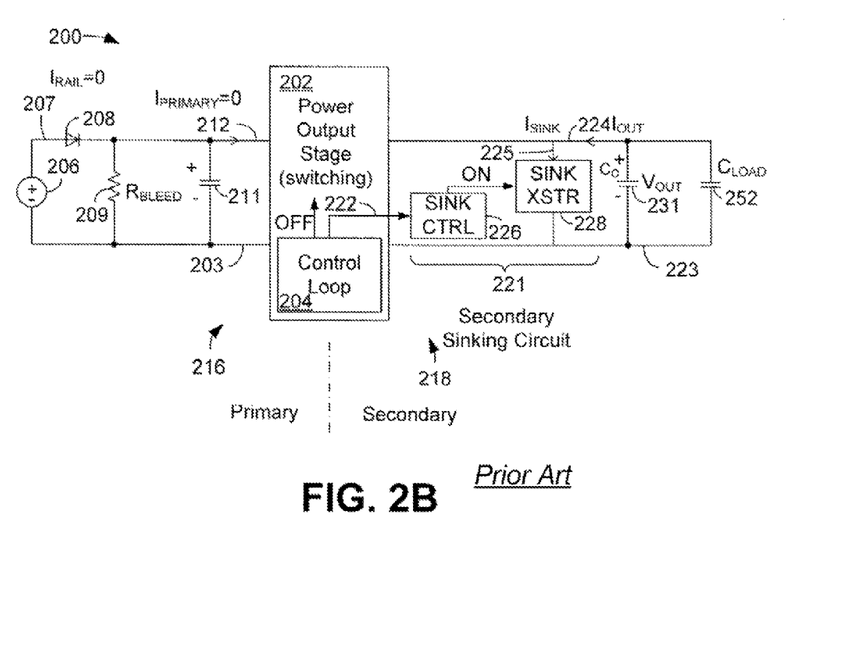
FIG. 2B is a schematic diagram illustrating the power supply module of FIG. 2A operating in quadrant two.

In the configuration shown in FIG. 2A, the power supply module 200 is said to be operating in quadrant one, in which the current sinking control circuit 226 deactivates the transistor 228. In this mode of operation, no current flows through the transistor 228 through connection 225. The transistor current is noted as $I_{SINK}$ in quadrant one operation, where $I_{SINK}=0$ FIG. 2B is a schematic diagram illustrating the power supply module 202 operating in quadrant two. In quadrant two operation, the control loop 204 turns off the power output stage 202 and provides a control signal on connection 222 to the current sinking control circuit 226. The control signal on connection 222 causes the current sinking control circuit 226 to activate, or turn on, the transistor 228. This initiates quadrant two operation, in which the output current on connection 224 reverses direction and begins flowing through the transistor 228 via connection 225. In this mode, the power supply module 200 is said to be "sinking" current, and the output current $I_{OUT}$ is referred to as a "sink" current and is referred to as $I_{SINK}$. Quadrant two operation reduces the voltage across the load capacitance 252 or alternatively, could discharge a battery with a constant ouput voltage. However, as mentioned above, locating the current sink circuitry on the secondary side of a power supply module presents certain challenges.

Figure 3:
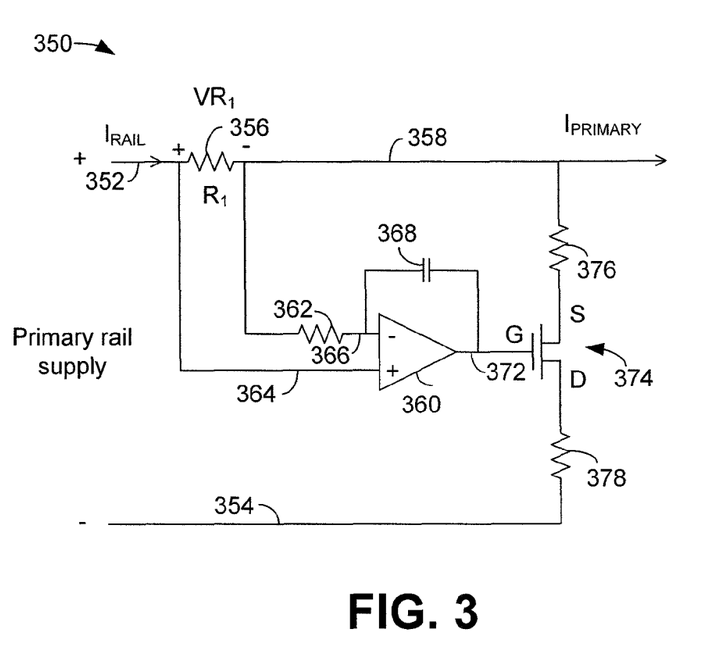
FIG. 3 is a simplified schematic diagram illustrating a current sinking circuit in accordance with an embodiment of the system and method for dissipating energy on the primary side of a bi-directional switching power supply.

FIG. 3 is a schematic diagram illustrating a current sinking circuit 350 in accordance with an embodiment of the system and method for dissipating energy on the primary side of a bi-directional switching power supply. The current sinking circuit 350 includes a shunt resistance 356 coupled between the positive power supply rail on connection 352 and the primary voltage connection 358. The positive power supply rail on connection 352 provides a current $I_{RAIL}$, and the power supply primary on connection 358 supplies a current $I_{PRIMARY}$. An error amplifier 360 is connected across the shunt resistance 356. The inverting input 366 of the error amplifier 360 is coupled via a resistance 362 to the power supply primary on connection 358. The non-inverting input of the error amplifier 360 is coupled via connection 364 to connection 352. A feedback capacitance 368 is provided from the output 372 of the error amplifier 360 to the inverting input 366.

A control element 374 is coupled through a resistance 376 to the power supply primary on connection 358 and to the negative power supply rail 354 via a resistance 378. In an embodiment, the control element 374 can be implemented as a transistor, such as a P-type metal oxide semiconductor field effect transistor (MOSFET). Alternatively, the control element 374 can be implemented as another type of transistor device, such as, for example, a bipolar junction transistor (BJT) or any other transistor device. Alternatively, the control element 374 could also be pulse width modulated, where it is either completely on or completely off, instead of a linearly acting transistor as described herein.

In the embodiment shown in FIG. 3, the control element 374 is implemented as a P-type MOSFET in which a source connection is coupled to the resistance 376 and a drain connection is coupled to the resistance 378. The gate of the transistor 374 is coupled to the output 372 of the error amplifier 360.

The error amplifier 360 responds to the polarity and amplitude of the voltage $V_{R1}$ across the shunt resistance 356. When the voltage on connection 352 is positive with respect to the voltage on connection 358, the output of the error amplifier 360 is positive ("high"), thus turning off the control element 374. When the transistor 374 is off, no current will flow from connection 358 to connection 354 through the control element 374.

When the voltage on connection 352 is negative with respect to the voltage on connection 358 the output of the error amplifier 360 is negative ("low"), thus turning on the control element 374. When the control element 374 is on, current will flow from connection 358 to connection 354 through the control element 374 and the resistances 376 and 378.

Figure 4:
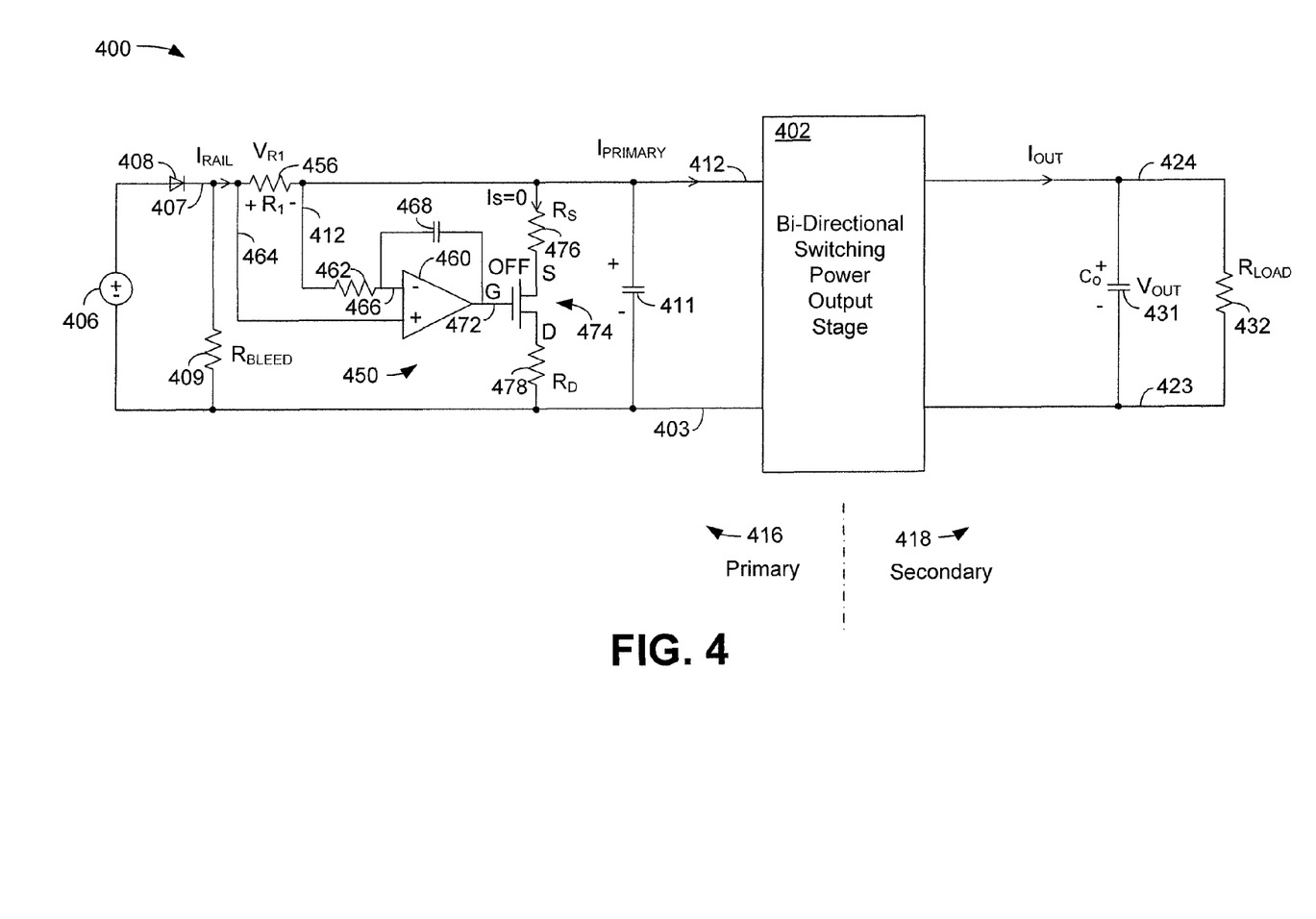
FIG. 4 is a schematic diagram illustrating a bidirectional switching power supply module operating in quadrant one in accordance with an embodiment of the system and method for dissipating energy on the primary side of a bi-directional switching power supply.

FIG. 4 is a schematic diagram illustrating a power supply module 400 in accordance with an embodiment of the system and method for dissipating energy on the primary side of a bi-directional switching power supply. The power supply module 400 includes a primary rail supply 406 coupled to a diode 408. The cathode of the diode 408 is coupled to connection 407. A bleed resistance 409 is connected between connection 407 and 403. A resistance 456 is located in series with the rail voltage on connection 407 and the primary supply on connection 412. The resistance 456 is referred to as a "shunt" resistance. The current on connection 407 is referred to as $I_{RAIL}$ and the current on connection 412 is referred to as $I_{PRIMARY}$. The voltage across the resistance 456 is referred to as $V_{R1}$.

The output of the power output stage 402 is provided on connection 424 through a load resistance 432. In this embodiment, the power output stage 402 is a bi-directional, switching power output stage. The current on connection 424 is referred to as $I_{OUT}$. The voltage output, $V_{OUT}$, of the power output stage 402 is provided across the capacitance of 431. The power supply module 400 is said to be operating in quadrant one because it is providing a positive voltage across the output capacitor 431 and is providing a positive current over connection 424. The primary side of the power supply module 400 is illustrated as 416 and the secondary side of the power supply module 400 is illustrated as 418.

In accordance with an embodiment of the system and method for dissipating energy on the primary side of a bi-directional switching power supply, the primary side 416 includes a current sinking circuit 450. The primary sinking circuit 450 is similar to the current sinking circuit 350 described in FIG. 3. The current sinking circuit 450 includes an error amplifier 460 connected across the shunt resistance 456. The inverting input 466 of the error amplifier 460 is coupled via a resistance 462 to the power supply primary on connection 412. The non-inverting input of the error amplifier 460 is coupled via connection 464 to connection 407. A feedback capacitance 468 is provided from the output 472 of the error amplifier 460 to the inverting input 466 of the error amplifier 460.

A control element 474 is coupled through a resistance 476 to the power supply primary on connection 412 and to the negative power supply rail 403 via a resistance 478. In an embodiment, the control element 474 can be implemented as a transistor, and when implemented as a transistor, can be implemented as a P-type MOSFET, as described above with control element 374. Alternatively, the control element 474 can be implemented as another type of transistor device, such as, for example, a bipolar junction transistor (BJT) or any other transistor device. Alternatively, the control element 374 could also be pulse width modulated, where it is either completely on or completely off, instead of a linearly acting transistor as described herein.

In the embodiment shown in FIG. 4, the control element 474 is implemented as a P-type MOSFET in which a source connection is coupled to a source resistance $R_S$ 476 and a drain connection is coupled to a drain resistance $R_D$ 478. The gate of the control element 474 is coupled to the output 472 of the error amplifier 460.

The error amplifier 460 responds to the polarity and amplitude of the voltage $V_{R1}$ across the resistance 456. When the voltage on connection 407 is positive with respect to the voltage on connection 412, the output of the error amplifier 460 is positive ("high"), thus turning off the control element 474. When the control element 474 is off, no current will flow from connection 412 to connection 403 through the control element 474.

As will be described more fully below, when the voltage on connection 407 is negative with respect to the voltage on connection 412 the output of the error amplifier 460 is negative ("low") thus turning on the control element 474. When the control element 474 is on, current will flow from connection 412 to connection 403 through the control element 474 and the resistances 476 and 478. This current is referred to as $I_S$ in FIG. 4.

In the embodiment shown in FIG. 4, the voltage on connection 407 is positive with respect to the voltage on connection 412, the output of the error amplifier 460 is positive ("high"), and the control element 474 is off. Thus, no current flows through the control element 474 from connection 412 to connection 403 and the power supply module 400 is said to be operating in quadrant one in which $I_S=0$.

Figure 5:
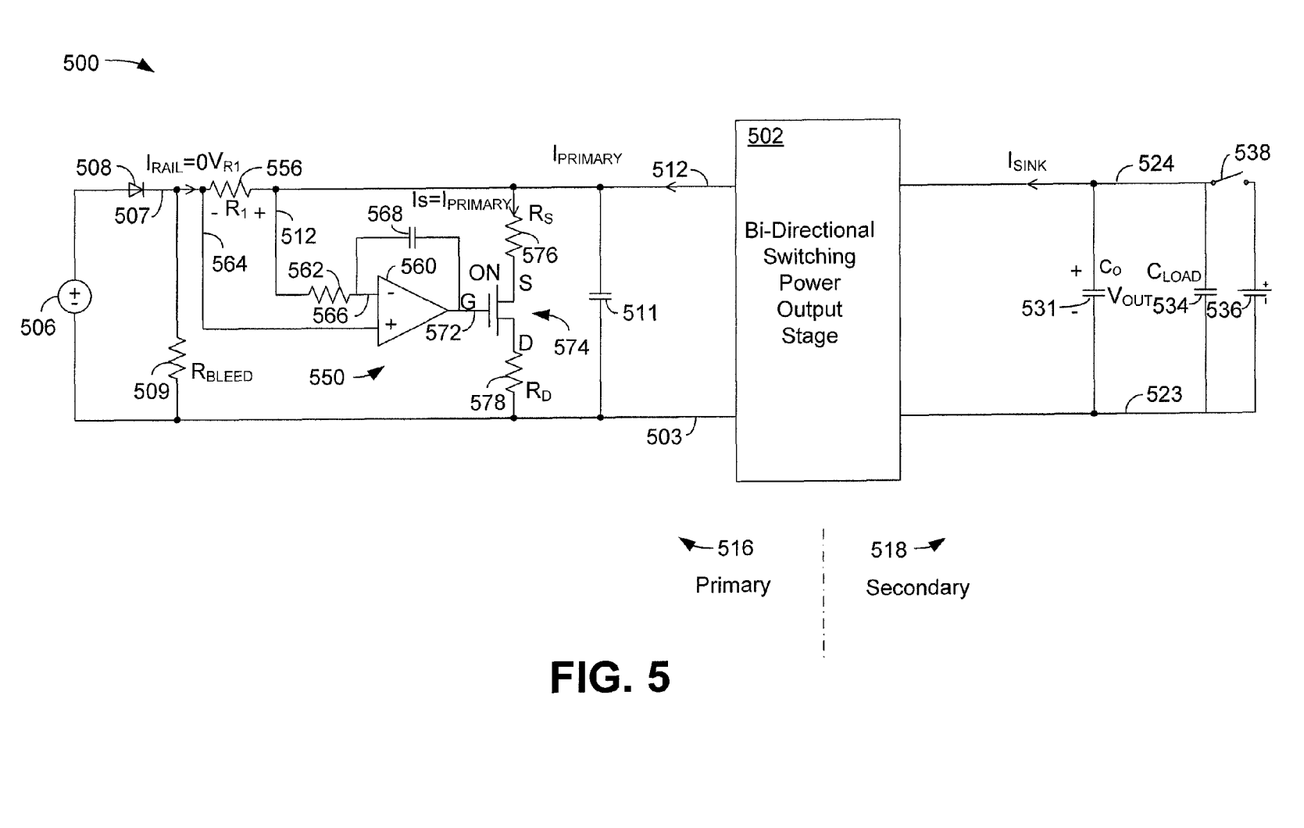
FIG. 5 is a schematic diagram illustrating the bidirectional switching power supply module of FIG. 4 operating in quadrant two in accordance with an embodiment of the system and method for dissipating energy on the primary side of a bi-directional switching power supply.

FIG. 5 is a schematic diagram illustrating the power supply module of FIG. 4 in accordance with an embodiment of the system and method for dissipating energy on the primary side of a bi-directional switching power supply.

FIG. 5 illustrates a bidirectional power supply module 500 operating in quadrant two. The power supply module 500 includes a primary rail supply 506 coupled to a diode 508. The cathode of the diode 508 is coupled to connection 507. A bleed resistance 509 is connected between connection 507 and 503. A resistance 556 is located in series with the rail voltage on connection 507 and the primary supply on connection 512. The resistance 556 is referred to as a "shunt" resistance. The current on connection 507 is referred to as $I_{RAIL}$ and the current on connection 512 is referred to as $I_{PRIMARY}$. The voltage across the resistance 556 is referred to as $V_{R1}$.

The output of the power output stage 502 is provided on connection 524 through a load capacitance 534. However, because the power supply module 500 is operating in quadrant two, in which the power output stage 502 provides a positive voltage and a negative current on connection 524, the current on connection 524 is reversed with respect to the current $I_{OUT}$ on connection 424 of FIG. 4 and is referred to as the current $I_{SINK}$. A battery 536 illustrates the flow of the current $I_{SINK}$. The switch 538 can be controlled to close when the power supply is, for example, connected to the battery 536 and the battery 536 is set to discharge through the power supply module 500. The power supply module 500 is said to be operating in quadrant two, in which current is flowing from the load capacitance 534, or from the battery 536 if the switch 538 is closed, through the power output stage 502 in the direction indicated by $I_{SINK}$. The voltage output, $V_{OUT}$, of the power output stage 502 is provided across the capacitance 531. The primary side of the power supply module 500 is illustrated as 516 and the secondary side of the power supply module 500 is illustrated as 518.

In accordance with an embodiment of the system and method for dissipating energy on the primary side of a bi-directional switching power supply, the primary side 516 includes a current sinking circuit 550. The current sinking circuit 550 is electronically similar to the current sinking circuit 450 shown in FIG. 4 and the current sinking circuit 350 described in FIG. 3. However, in FIG. 5, quadrant two operation is depicted.

The current sinking circuit 550 includes an error amplifier 560 connected across the resistance 556. The inverting input 566 of the error amplifier 560 is coupled via a resistance 562 to the power supply primary on connection 512. In this example, the current $I_{PRIMARY}$ on connection 512 is shown as flowing in a direction opposite the direction of the current $I_{PRIMARY}$ shown in FIG. 4 because the power output stage 502 is sinking current in FIG. 5. The non-inverting input of the error amplifier 560 is coupled via connection 564 to connection 507. A feedback capacitance 568 is provided from the output 572 of the error amplifier 560 to the inverting input 566.

A control element 574 is coupled through a resistance 576 to the power supply primary on connection 512 and to the negative power supply rail 503 via a resistance 578. In an embodiment, the control element 574 can be implemented as a transistor, and when implemented as a transistor, can be implemented as a P-type MOSFET. Alternatively, the control element 574 can be implemented as another type of transistor device, such as, for example, a bipolar junction transistor (BJT) or any other transistor device.

In the embodiment shown in FIG. 5, the control element 574 is implemented as a P-type MOSFET in which a source connection is coupled to a source resistance $R_S$ 576 and a drain connection is coupled to a drain resistance $R_D$ 578. The gate of the control element 574 is coupled to the output 572 of the error amplifier 560.

The error amplifier 560 responds to the polarity and amplitude of the voltage $V_{R1}$ across the resistance 556. When the voltage on connection 507 is positive with respect to the voltage on connection 512 (such as when operating in quadrant one), the output of the error amplifier 560 is positive ("high"), thus turning off the control element 574. When the control element 574 is off, no current will flow from connection 512 to connection 503 through the control element 574, as described above.

However, when the voltage on connection 507 is negative with respect to the voltage on connection 512 (such as when operating in quadrant two) the output of the error amplifier 560 is negative ("low") thus turning on the control element 574. When the control element 574 is on, current flows from connection 512 to connection 503 through the control element 574 and the resistances 576 and 578. This current is referred to as $I_S$ in FIG. 5 and is equal to the current $I_{PRIMARY}$.

In the embodiment shown in FIG. 5, the voltage on connection 507 with respect to the voltage on connection 512 is held at zero by the high gain error amplifier 560. The output of the error amplifier 560 is negative ("low"), and the control element 574 is on. Thus, a current flows through the control element 574 from connection 512 to connection 503 and the power supply module 500 is said to be operating in quadrant two in which $I_S=I_{PRIMARY}$. As mentioned above, when the power supply module 500 is operating in quadrant two, the current $I_{PRIMARY}$ corresponds to the current $I_{SINK}$ as it passes through the power output stage 502.

When the power output stage 502 is operating in quadrant two, the current $I_{PRIMARY}$ on connection 512 flows in the direction shown due to the net transfer of power from the secondary side 518 through the power output stage 502, to the primary side 516. If the control element 574 were initially off, this would cause a change in the polarity of the voltage across the resistance 556 that is automatically detected by the error amplifier 560. When the error amplifier 560 detects the change in the polarity of the voltage across the resistance 556, the output of the error amplifier 560 goes negative, thus turning on the control element 574. The output of the error amplifier 560 reaches equilibrium when sufficient gate voltage is applied to the gate of the control element 574 such that the current $I_S=I_{PRIMARY}$, thus holding the voltage $V_{R1}$ and the current through the shunt $R_1$ at zero. In this manner, any energy to be dissipated due to $I_{SINK}$ (either momentary or continuous) at the output of the power supply module 500 across the connections 524 and 523, is transferred to the primary side 516 to be dissipated by the control element 574 and the resistance 578.

If the current $I_{SINK}$ is momentary, such as would occur by discharging a capacitive load (capacitance 534 and capacitance 531), then, when the current $I_{SINK}$ is no longer present, the output of the error amplifier 560 goes high, turning off the control element 574 terminating the conduction of the sink current $I_S=I_{PRIMARY}$ through the control element 574. In the case of a continuous level of $I_{SINK}$, which could be due to discharging the battery 536 on the power supply output, the error amplifier 560 will automatically maintain control of the conduction of the control element 574 to ensure that $I_S=I_{PRIMARY}$ and keep the voltage $V_{R1}$ across the shunt resistance 556 equal to zero. Thus, the need for control circuitry between the secondary side 518 and the primary side 516 is eliminated.

The control element 574 conducts just enough current to make the current flowing through the source resistor 576 $I_S=I_{PRIMARY}$ because the error amplifier 560 is configured to prevent the current $I_{RAIL}$ from becoming negative. This eliminates the need for a complex control circuit. Further, because the current sinking circuit 550 is located on the primary side 516, it is subjected to the relatively constant voltage of the primary rail supply 506. Therefore, the control element 574 need not exhibit a particularly low resistance when on, and can easily conduct the reversed current $I_{PRIMARY}=I_{SINK}$ shown in FIG. 5, when the output voltage, $V_{OUT}$, is low. Further, because the voltage of the primary rail supply 506 is relatively constant, the drain resistance 578 can be used to reduce the power dissipation and minimize temperature rise in the control element 574.

Figure 6:
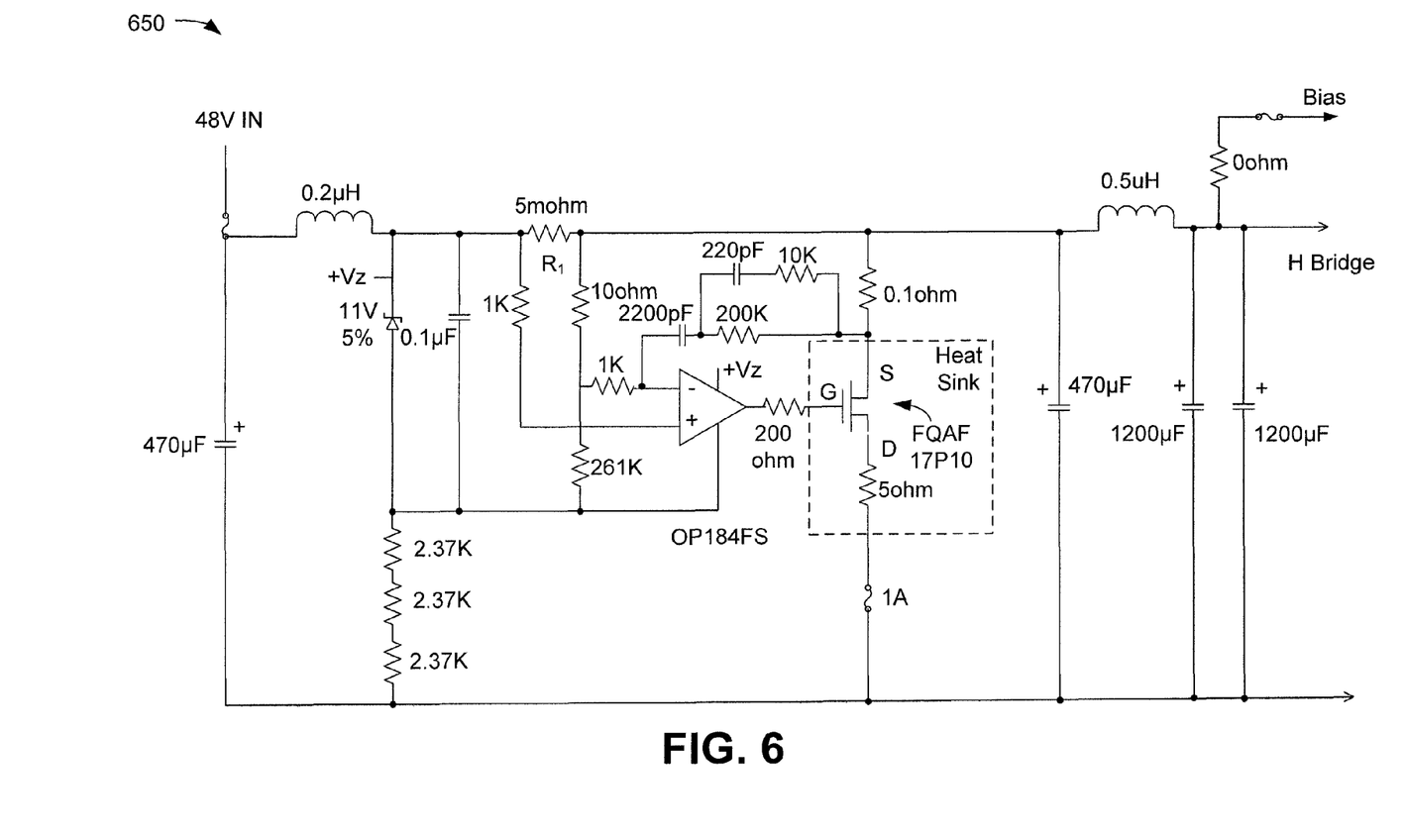
FIG. 6 is a schematic diagram illustrating an exemplary implementation of the current sinking circuit of FIGS. 4 and 5.

FIG. 6 is a schematic diagram illustrating an exemplary implementation 650 of the current sinking circuit 350 described above. The component values shown in FIG. 6 are for exemplary purposes only. Those skilled in the art will recognize that various alternative implementations will be possible, depending on the particular application.

Figure 7:
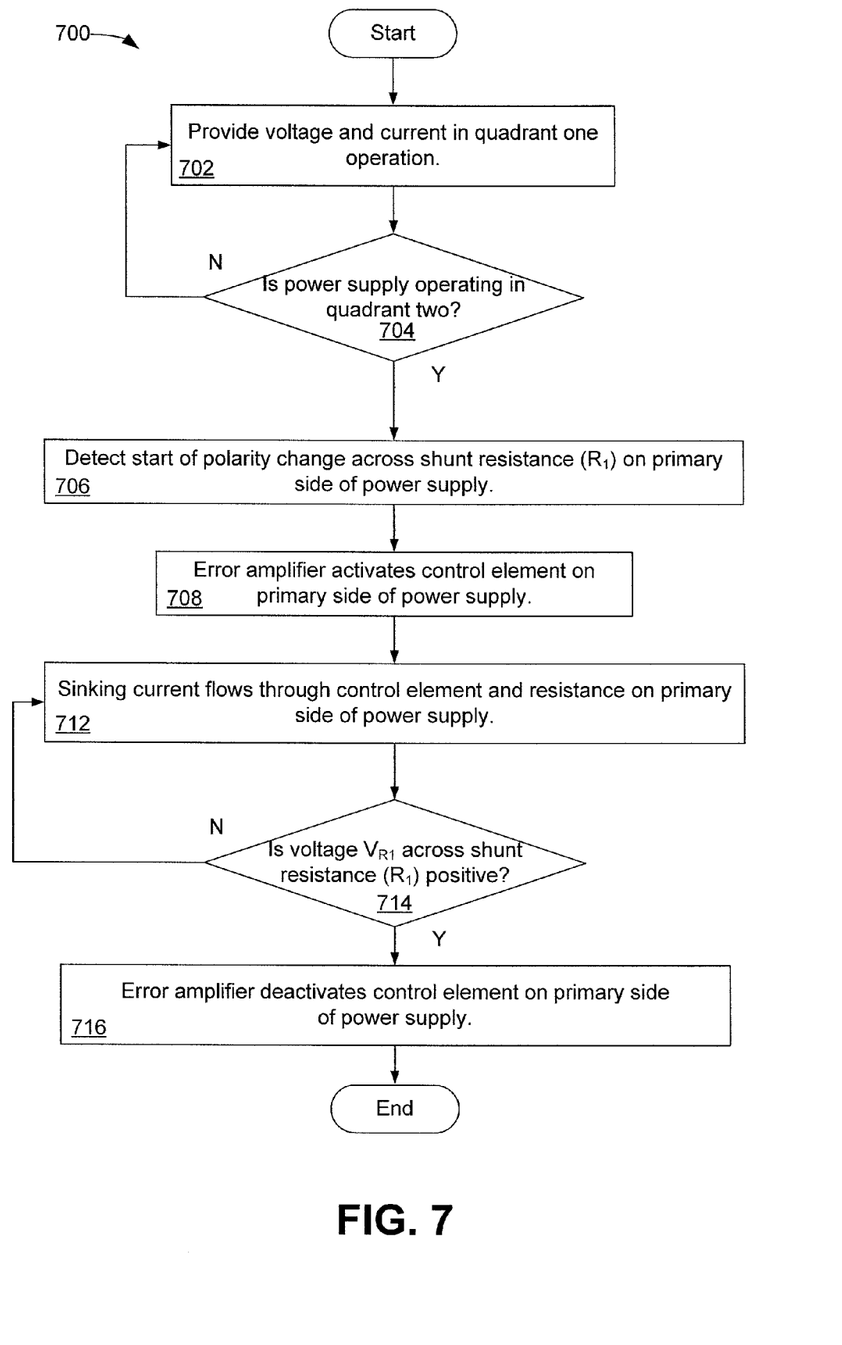
FIG. 7 is a flowchart describing an example of the operation of a method for dissipating energy on the primary side of a bi-directional switching power supply.

FIG. 7 is a flowchart 700 describing the operation of an embodiment of the system for dissipating energy on the primary side of a bi-directional switching power supply. The blocks in the flowchart can be performed in or out of the order shown. In block 702 a power supply module provides voltage and current output in quadrant one operation. In block 704 it is determined whether the power supply module is sinking current from the secondary side to the primary side, i.e., whether the power supply is operating in quadrant two. If, in block 704, it is determined that the power supply module is not sinking current from the secondary side to the primary side, the process returns to block 702.

If, in block 704, it is determined that the power supply module is sinking current from the secondary side to the primary side, then in block 706 the error amplifier 560 (FIG. 5) detects a polarity change across the resistance 556 (FIG. 5). In block 708 the error amplifier 560 (FIG. 5) activates the transistor 574 (FIG. 5) on the primary side 516 (FIG. 5) of the power supply. In block 712, a sink current, $I_{SINK}$, flows through the transistor 574 (FIG. 5) and the resistance 578 (FIG. 5) on the primary side 516 (FIG. 5) of the power supply module 500 (FIG. 5).

In block 714 it is determined whether the voltage across the resistance 556 (FIG. 5) is positive. If the voltage across the resistance 556 (FIG. 5) is not positive, then the process returns to block 712. If, in block 714 it is determined that the voltage across the resistance 556 (FIG. 5) is positive indicating quadrant one operation, then, in block 716, the error amplifier 560 (FIG. 5) deactivates the transistor 574 (FIG. 5) on the primary side 516 (FIG. 5) of the power supply module 500 (FIG. 5) and quadrant two operation ends.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for dissipating energy in a power supply, comprising:
    a bidirectional switching power output stage coupled to a primary power supply side and a secondary power supply side, the bi-directional switching power output stage configured to provide a positive voltage and a positive current, the bi-directional switching power output stage also configured to provide a positive voltage and to receive a current; and
    a current sinking circuit coupled to the primary power supply side, the current sinking circuit configured to dissipate energy when the secondary power supply side of the switching power supply is receiving current.

2. The system of claim 1, wherein the current sinking circuit further comprises:
    an error amplifier having first and second inputs coupled across a resistance and an output; and
    a control element coupled to the output of the error amplifier, and coupled to the primary power supply side, wherein the error amplifier senses a polarity of a voltage across the resistance.

3. The system of claim 2, wherein the error amplifier turns the control element off when a voltage across the resistance indicates that the power output stage is providing a positive voltage and a positive current.

4. The system of claim 2, wherein the error amplifier turns the control element on when a voltage across the resistance indicates that the power output stage is providing a positive voltage and a negative current.

5. The system of claim 4, further comprising a resistance associated with the control element, in which the negative current flows through the power output stage to the primary power supply side and flows through the control element and the resistance associated with the control element.

6. The system of claim 5, in which a value of the resistance associated with the control element is chosen to reduce the power dissipation and minimize temperature rise in the control element.

7. The system of claim 4, in which the control element is implemented as a P-type metal oxide semiconductor field effect transistor (MOSFET).

8. A switching power supply, comprising:
    a switching power output stage coupled to a primary power supply side and a secondary power supply side, the switching power output stage configured to operate in quadrant one and in quadrant two; and
    a current sinking circuit coupled to the primary power supply side, the current sinking circuit configured to dissipate energy when the switching power supply is operating in quadrant two.

9. The power supply of claim 8, wherein the current sinking circuit further comprises:
    an error amplifier having first and second inputs coupled across a resistance and an output; and
    a control element coupled to the output of the error amplifier, and coupled to the primary power supply side, wherein the error amplifier senses a polarity of a voltage across the resistance, wherein a positive voltage across the resistance is indicative of power supply operation in quadrant one and in which a negative voltage across the resistance is indicative of power supply operation in quadrant two.

10. The power supply of claim 9, wherein the error amplifier turns the control element off when the polarity of the voltage across the resistance is indicative of power supply operation in quadrant one.

11. The power supply of claim 9, wherein the error amplifier turns the control element on when the polarity of the voltage across the resistance is indicative of power supply operation in quadrant two.

12. The power supply of claim 11, further comprising a resistance associated with the control element, in which a current flows from the secondary power supply side through the power output stage to the primary power supply side and in which the current flows through the control element and the resistance associated with the control element.

13. The power supply of claim 12, in which a value of the resistance associated with the control element is chosen to reduce the power dissipation and minimize temperature rise in the switch.

14. The power supply of claim 11, in which the control element is implemented as a P-type metal oxide semiconductor field effect transistor (MOSFET).

15. A method for dissipating energy in a power supply, comprising:
    detecting energy on a secondary side of a power output stage, the detecting comprising sensing a voltage across a resistance associated with the primary side of the power output stage; and
    dissipating the energy from the secondary side of the power output stage to a primary side of the power output stage, the dissipating comprising activating a control element associated with the primary side of the power output stage to conduct the energy through the primary side of the power output stage.

16. The method of claim 15, further comprising terminating the dissipation of the energy when the voltage across the resistance indicates that the power output stage is providing a positive voltage and a positive current.

17. The method of claim 15, further comprising providing a resistance associated with the control element, in which a current output associated with the dissipating energy flows through the power output stage to the primary side of the power output stage and flows through the control element and the resistance associated with the control element.

18. The method of claim 17, in which a value of the resistance associated with the control element is chosen to reduce the power dissipation and minimize temperature rise in the control element.

19. The method of claim 17, in which the control element is implemented as a P-type metal oxide semiconductor field effect transistor (MOSFET).

* * * * *